United States Patent [19]
Souissi et al.

[11] Patent Number: 6,091,959
[45] Date of Patent: Jul. 18, 2000

[54] METHOD AND APPARATUS IN A TWO-WAY WIRELESS COMMUNICATION SYSTEM FOR LOCATION-BASED MESSAGE TRANSMISSION

[75] Inventors: Slim Souissi, Fort Worth; Thomas Casey Hill, Trophy Club; Dwight Randall Smith, Grapevine; Jheroen Pieter Dorenbosch, Paradise, all of Tex.

[73] Assignee: Motorola, Inc., Schaumburg, Ill.

[21] Appl. No.: 09/324,269

[22] Filed: Jun. 2, 1999

[51] Int. Cl.[7] ............... G08B 5/22; H04B 7/185
[52] U.S. Cl. .......... 455/456; 455/457; 455/435; 340/988; 340/825.44; 342/357.09
[58] Field of Search ................... 455/456, 457, 455/435; 340/988, 991, 993, 825.44; 342/357.01, 357.88, 357.09, 357.1, 450, 451

[56] References Cited

U.S. PATENT DOCUMENTS

| | | |
|---|---|---|
| 5,327,144 | 7/1994 | Stilp et al. ............... 455/456 |
| 5,343,512 | 8/1994 | Wang et al. ............... 455/456 |
| 5,408,683 | 4/1995 | Ablay et al. ............... 455/456 |
| 5,546,445 | 8/1996 | Dennison et al. ........... 455/456 |
| 5,592,154 | 1/1997 | Lin et al. ................. 340/988 |
| 5,666,647 | 9/1997 | Maine ..................... 455/456 |
| 5,732,387 | 3/1998 | Armbruster et al. ......... 455/456 |
| 5,745,481 | 4/1998 | Phillips et al. ............ 370/313 |
| 5,797,097 | 8/1998 | Roach, Jr. et al. ......... 455/456 |
| 5,883,580 | 3/1999 | Briancon et al. ........... 340/825.44 |

*Primary Examiner*—Lee Nguyen
*Assistant Examiner*—Simon Nguyen
*Attorney, Agent, or Firm*—R. Louis Breeden

[57] ABSTRACT

A table (328) is created (402) for mapping, for ones of a plurality of portable subscriber units (122), a plurality of message types to a corresponding plurality of locations. A message matching one of the plurality of message types is then received (404) by a controller (112), the message intended for a portable subscriber unit. In response, the controller and the portable subscriber unit cooperate to determine (406) the location of the portable subscriber unit. The controller sends (428) the message to the portable subscriber unit when the location matches one of the plurality of locations corresponding to the one of the plurality of message types.

19 Claims, 4 Drawing Sheets

METHOD AND APPARATUS IN A TWO-WAY WIRELESS COMMUNICATION SYSTEM FOR LOCATION-BASED MESSAGE TRANSMISSION

FIELD OF THE INVENTION

This invention relates in general to wireless communication systems, and more specifically to a method and apparatus in a two-way wireless communication system for location-based message transmission.

BACKGROUND OF THE INVENTION

Location-determining technologies are becoming increasingly important in wireless communication systems. Early applications have concentrated primarily on techniques for improving transmission reliability and frequency reuse. Now, as the location-determining technologies mature, a need for location-driven features is emerging.

One such feature is location-based message transmission. A method and apparatus is needed that will allow control of both inbound and outbound message transmissions, based upon the location of a portable subscriber unit that is receiving or sending a message, and further based upon the type of message.

SUMMARY OF THE INVENTION

An aspect of the present invention is a method in a two-way wireless communication system for location-based message transmission. The method comprises the steps of creating a table for mapping, for ones of a plurality of portable subscriber units, a plurality of message types to a corresponding plurality of locations; and receiving a message matching one of the plurality of message types, the message intended for a portable subscriber unit. The method further comprises the steps of determining a location at which the portable subscriber unit is positioned, and sending the message to the portable subscriber unit when the location matches one of the plurality of locations corresponding to the one of the plurality of message types.

Another aspect of the present invention is a method in a two-way wireless communication system for location-based message transmission. The method comprises the steps of sending a broadcast message to a plurality of portable subscriber units, the broadcast message specifying a geographic location and a maximum distance; and determining, in response to the broadcast message, a corresponding plurality of locations at which the plurality of portable subscriber units are positioned. The method further comprises the steps of calculating a plurality of distances between the geographic location and the corresponding plurality of locations; and identifying ones of the plurality of portable subscriber units having a distance less than the maximum distance.

A third aspect of the present invention is a controller in a two-way wireless communication system for location-based message transmission. The controller comprises a network interface for receiving a message, a processing system coupled to the network interface for processing the message, and a base station interface coupled to the processing system for controlling and communicating with a base station. The processing system is programmed to create a table for mapping, for ones of a plurality of portable subscriber units, a plurality of message types to a corresponding plurality of locations; and to receive the message matching one of the plurality of message types, the message intended for a portable subscriber unit. The processing system is further programmed to determine a location at which the portable subscriber unit is positioned, and to send the message to the portable subscriber unit when the location matches one of the plurality of locations corresponding to the one of the plurality of message types.

A fourth aspect of the present invention is a controller in a two-way wireless communication system for location-based message transmission. The controller comprises a network interface for receiving a message, a processing system coupled to the network interface for processing the message, and a base station interface coupled to the processing system for controlling and communicating with a base station. The processing system is programmed to send a broadcast message to a plurality of portable subscriber units, the broadcast message specifying a geographic location and a maximum distance; and to receive a response from ones of the plurality of portable subscriber units identifying the ones of the plurality of portable subscriber units having a distance from the geographic location of less than the maximum distance.

A fifth aspect of the present invention is a portable subscriber unit in a two-way wireless communication system for location-based message transmission. The portable subscriber unit comprises a receiver for receiving an outbound message, a processing system coupled to the receiver for processing the outbound message, and a transmitter coupled to the processing system for transmitting an inbound message. The processing system is programmed to cooperate with the receiver to receive a broadcast message specifying a geographic location and a maximum distance; and to determine, in response to the broadcast message, a location at which the portable subscriber unit is positioned. The processing system is further programmed to calculate a distance between the geographic location and the location at which the portable subscriber unit is positioned, and to cooperate with the transmitter to transmit information identifying the portable subscriber unit to a fixed portion of the two-way wireless communication system when the distance is less than the maximum distance.

DETAILED DESCRIPTION OF THE DRAWINGS

Figure 1:
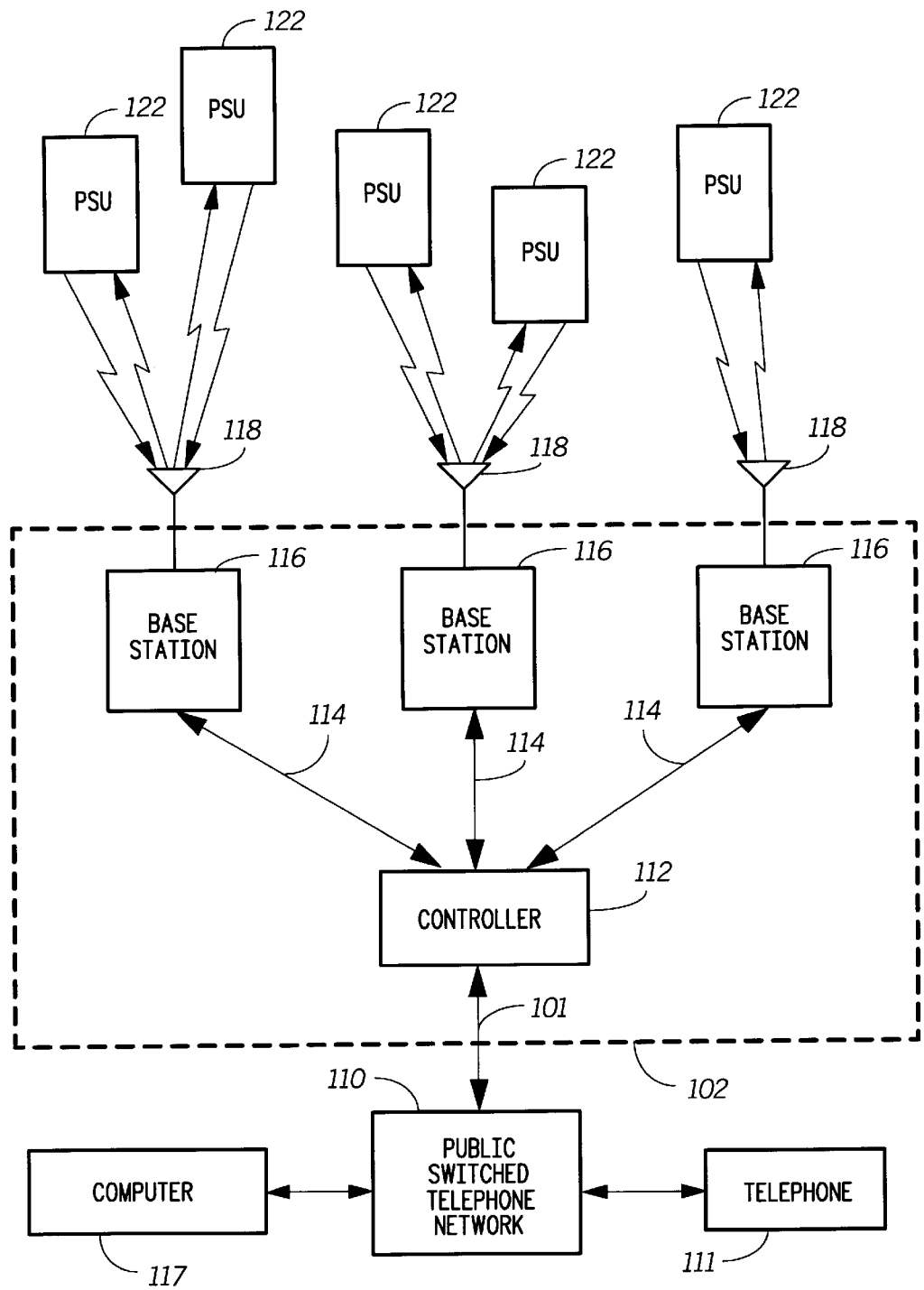
FIG. 1 is an electrical block diagram of an exemplary wireless communication system in accordance with the present invention.

Referring to FIG. 1, an electrical block diagram depicts an exemplary wireless communication system in accordance with the present invention, comprising a fixed portion 102 including a controller 112 and a plurality of conventional base stations 116, the wireless communication system also including a plurality of portable subscriber units 122. The base stations 116 preferably communicate with the portable subscriber units 122 utilizing conventional radio frequency (RF) techniques, and are coupled by conventional communication links 114 to the controller 112, which controls the base stations 116.

The hardware of the controller 112 is preferably a combination of a Choreographer!™ network management device, a Wireless Messaging Gateway (WMG™) Administrator!™ terminal, an RF-Usher!™ multiplexer, and an RF-Conductor!™ message distributor manufactured by Motorola, Inc., and utilizes software modified in accordance with the present invention. The hardware of the base stations 116 is preferably a combination of the RF-Orchestra!™ transmitter and the RF-Audience!™ receiver manufactured by Motorola, Inc. The portable subscriber units 122 are preferably similar to PageWriter™ 2000 data portable subscriber units, also manufactured by Motorola, Inc., and also utilize software modified in accordance with the present invention. It will be appreciated that other similar hardware can be used as well for the controller 112, the base stations 116, and the portable subscriber units 122.

Each of the base stations 116 transmits RF signals to the portable subscriber units 122 via an antenna 118. The base stations 116 preferably each receive RF signals from the plurality of portable subscriber units 122 via the antenna 118. The RF signals transmitted by the base stations 116 to the portable subscriber units 122 (outbound messages) comprise selective call addresses identifying the portable subscriber units 122, and data messages originated by a message originator, as well as commands originated by the controller 112 for adjusting operating parameters of the radio communication system. The RF signals preferably transmitted by the portable subscriber units 122 to the base stations 116 (inbound messages) comprise responses that include scheduled messages, such as positive acknowledgments (ACKs) and negative acknowledgments (NAKs), and unscheduled messages, such as registration requests and requests for items of information.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. It will be appreciated that, alternatively, other types of networks, e.g., a local area network (LAN), a wide area network (WAN), and the Internet, to name a few, can be used for receiving selective call originations. It will be further appreciated that the computer 117 can also function as a server for providing various applications utilized by the wireless communication system. In that mode, the computer 117 is preferably coupled directly to the controller 112 without going through the PSTN.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well. It also will be appreciated that, while the exemplary wireless communication system just described is a store-and-forward messaging system, the present invention is applicable to real-time wireless communication systems, such as cellular telephone systems, as well.

Figure 2:
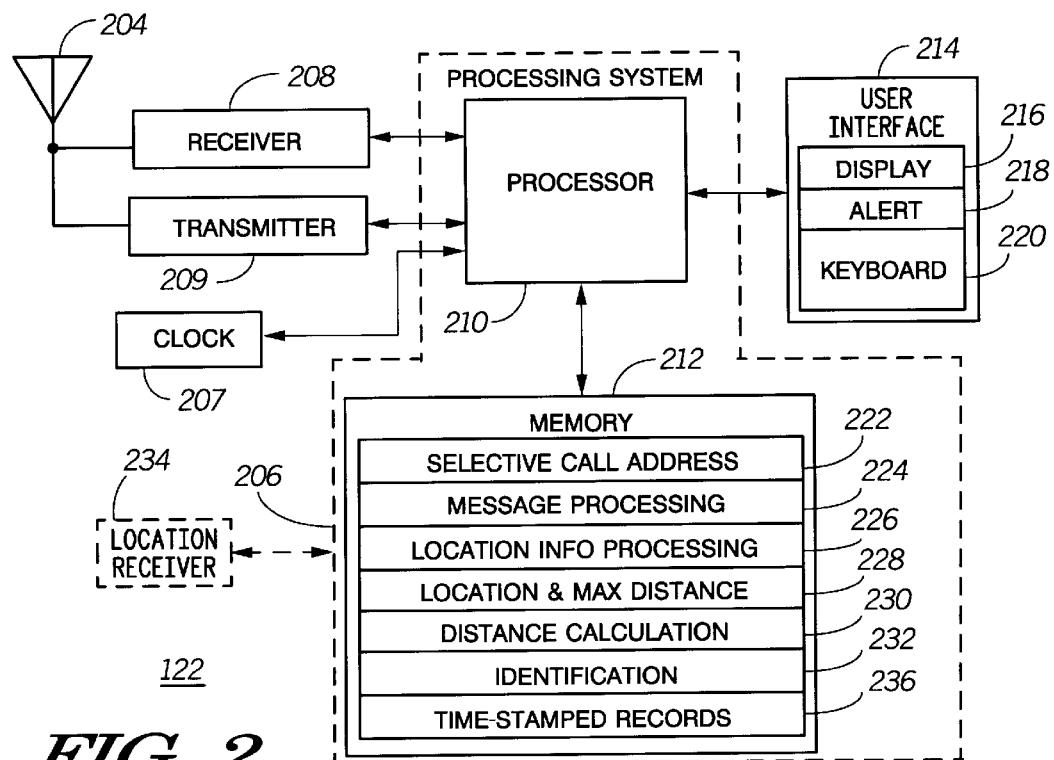
FIG. 2 is an electrical block diagram of an exemplary portable subscriber unit in accordance with the present invention.

FIG. 2 is an electrical block diagram of the exemplary portable subscriber unit 122 in accordance with the present invention. The portable subscriber unit 122 comprises an antenna 204 for intercepting an outbound message and for transmitting an inbound message. The antenna 204 is preferably coupled to a conventional receiver 208 for receiving the outbound message and is coupled to a conventional transmitter 209 for transmitting the inbound message. The receiver 208 and transmitter 209 are coupled to a processing system 206 for processing the outbound and inbound messages and for controlling the portable subscriber unit 122 in accordance with the present invention. A user interface 214 preferably is also coupled to the processing system 206 for interfacing with a user. The user interface 214 comprises a conventional keyboard 220 for controlling the portable subscriber unit 122, a conventional display 216 for displaying messages and other information, and a conventional alert element 218 for alerting the user when an outbound message arrives. A conventional clock 207 is also coupled to the processing system 206 for supporting time keeping requirements of the portable subscriber unit 122.

The processing system 206 comprises a conventional processor 210 and a conventional memory 212. The memory 212 comprises software elements and data for programming the processing system 206 in accordance with the present invention. The memory 212 preferably includes a selective call address 222 to which the portable subscriber unit 122 is responsive. In addition, the memory 212 includes a message processing element 224 for programming the processing system 206 to process messages through well-known techniques. The memory 212 further comprises a location information processing program 226 for programming the processing system 206 to process location information in accordance with the present invention. The memory 212 also includes a space for storing a location and a maximum distance 228 utilized in an aspect of the present invention. The memory 212 also includes a distance calculation program 230 for programming the processing system 206 to calculate the distance between a specific location and the location at which the portable subscriber unit 122 is positioned. The memory 212 further comprises an identification program 232 for programming the processing system 206 to identify the portable subscriber unit 122 to the fixed portion 102. The memory 212 also includes a space for storing time-stamped records 236 comprising locations at which the portable subscriber unit 122 has been positioned. In one embodiment, the portable subscriber unit 122 also includes a location receiver 234, such as a Global Positioning System (GPS) receiver, coupled to the processing system 206 for helping determine the location information through well-known techniques. Operation of the portable subscriber unit 122 in accordance with the present invention is described in detail further below.

Figure 3:
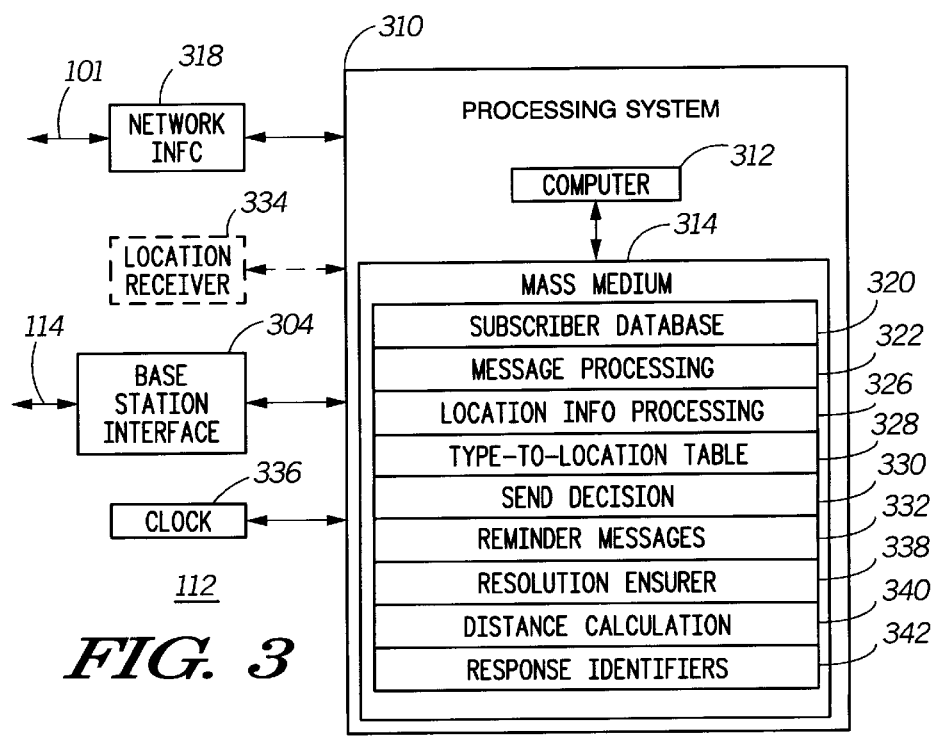
FIG. 3 is an electrical block diagram of an exemplary controller in accordance with the present invention.

FIG. 3 is an electrical block diagram depicting an exemplary controller 112 in accordance with the present invention. The controller 112 comprises a network interface 318 for receiving a message from a message originator via the telephone links 101. The network interface 318 is coupled to a processing system 310 for controlling and communicating with the network interface 318. The processing system is coupled to a base station interface 304 for controlling and communicating with the base stations 116 via the communication links 114. The processing system 310 is also coupled to a conventional clock 336 for providing a timing signal to the processing system 310. The processing system 310 comprises a conventional computer 312 and a conventional mass medium 314, e.g., a magnetic disk drive, programmed with information and operating software in accordance with the present invention. The mass medium 314 comprises a conventional subscriber database 320 for storing profiles defining service for subscribers using the system. The mass medium 314 further comprises a message processing element 322 for processing messages through well-known techniques.

The mass medium 314 also includes a location information processing program 326 for programming the processing system 310 to process location information in accordance with the present invention. The mass medium 314 also includes a type-to-location table 328 for mapping, for ones of the plurality of portable subscriber units, a plurality of message types into a corresponding plurality of locations, along with the minimum location resolution required for each message type. The mass medium 314 also includes a send decision program 330 for programming the processing system 310 to send a message to the portable subscriber unit 122 when the location matches one of the plurality of locations corresponding to one of the plurality of message types. The mass medium 314 further comprises a space for storing a plurality of reminder messages 332, each generated by a user of one of the plurality of portable subscriber units 122 for reminding the user to perform an activity during a predetermined time frame, the activity facilitated by being within a predetermined distance of a specific location. In one embodiment, the controller 112 also includes a resolution ensurer program 338 for programming the processing system 310 to ensure that a location has been determined at a resolution of at least a minimum required resolution before sending the message. Also included in the mass medium 314 is a distance calculation program 340 for programming the processing system 310 to calculate a distance between a specific location and the location at which the portable subscriber unit 122 is positioned. In addition, the mass medium 314 includes space for a plurality of response identifiers 342 received from portable subscriber units 122 that are less than a maximum distance from a specific location. Operation of the controller 112 in accordance with the present invention is described further below.

Figure 4:
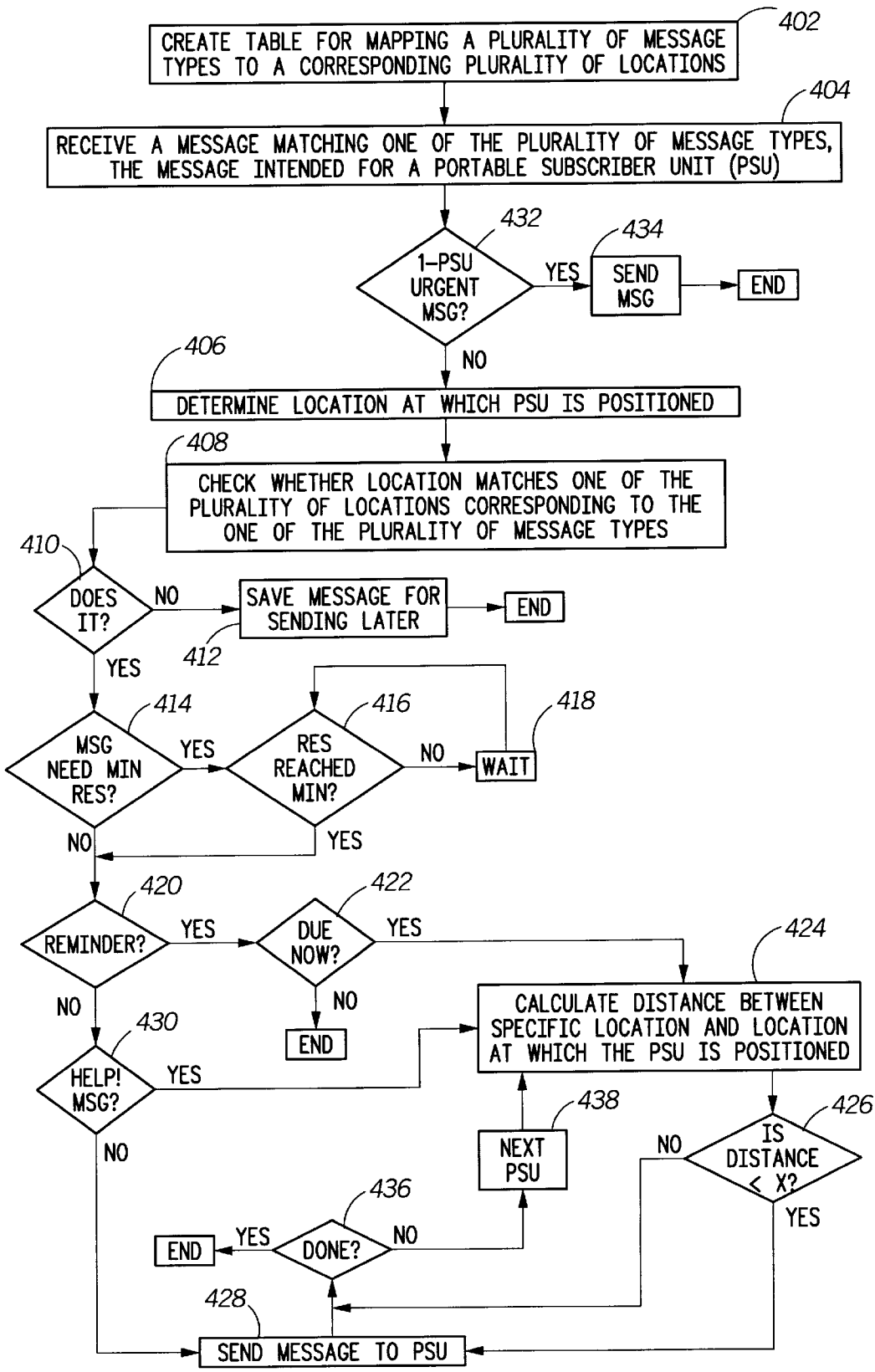
FIG. 4 is a flow diagram depicting operation of the exemplary wireless communication system in accordance with a first embodiment of the present invention.

FIG. 4 is a flow diagram depicting operation of the exemplary wireless communication system in accordance with a first embodiment of the present invention. The flow begins with the creation 402 of the type-to-location table 328, preferably in the controller 112, for mapping, for ones of the portable subscriber units 122, a plurality of message types to a corresponding plurality of locations. Here, the term "message type" is meant to include a mixture of message characteristics, such as source, urgency, and purpose of the message. Source, for example, can be used as an indicator of whether a message (or a call) is an internal business message or a friends and leisure call. Purpose, for example, can be to remind oneself to do some task, to convey information from someone else, to generate a coupon, to call for help, or to report traffic information. The table 328 can be set up to allow the portable subscriber unit 122 to receive or send certain types of messages when the portable subscriber unit is located at (or near) certain locations. For example, the table can be set up to allow one to: receive business messages (or calls) only at work, receive friends and leisure messages only outside of work, receive traffic updates only when driving, receive coupons or ads only at malls, receive urgent messages anywhere, receive reminders when near a location that facilitates accomplishing the task one is being reminded to do, and respond to certain types of messages only when close to a specific location.

Next, the controller 112 receives 404 a message intended for a portable subscriber unit 122 and matching one of the plurality of message types in the table 328 corresponding to the portable subscriber unit 122. The message can be generated external to the controller, e.g., from an incoming telephone call, or internal to the controller, e.g., by way of a reminder message becoming due. When the message is external, the controller preferably infers the message type from the calling line identification (CLI), provided through well-known techniques. When the message originates from the Internet, the controller preferably determines the message type from the originator's URL. Other aspects of the message, such as the address for which the message is intended, e.g., priority address, information services address, personal message address, etc., also can be used to help identify the message type.

The controller 112 checks 432 whether the message is an urgent message intended for an individual portable subscriber unit 122. If so, the controller 112 sends 434 the message as soon as possible, and the process ends. Urgency is preferably determined from the message content, e.g., a numeric message beginning with "911" or an alphanumeric message beginning with "urgent". It will be appreciated that, alternatively, urgency can be associated with the PIN or telephone number of the subscriber unit 122. When the message originates from the Internet, the originator can indicate urgency by checking a box labeled "urgent" on an origination dialog box through well-known techniques. If desired to prevent misuse, a password can be required from the originator to send an urgent message. It will be further appreciated that, alternatively, multiple levels of urgency can be provisioned in some systems. In such systems, the highest level of urgency, for example, can be sent immediately without checking for message type, while lower levels of urgency can be treated similar to non-urgent messages.

If at step 432 the message is not urgent, the controller 112 then cooperates with the portable subscriber unit 122 to determine 406 the location at which the portable subscriber unit 122 is positioned. The controller then checks 408 whether the location of the portable subscriber unit 122 matches a location indicated in the table 328 as corresponding to the message type. For example, when the message type is "non-urgent business," is the location of the portable subscriber unit 122 at one's place of business? If not, at 410 the flow is routed to step 412, where the controller 112 saves the message for sending later when the portable subscriber unit 122 is in a location suitable for the message type. Alternatively, in a real-time voice system, for example, the controller can route the caller to a voice mail system for storing a message.

If, on the other hand, at step 410 the location does match, then the controller checks 414 whether the table 328 indicates that the message type requires a minimum resolution of the location of the portable subscriber unit 122. If so, the controller 112 checks 416 whether the portable subscriber unit 122 has acquired the minimum resolution. If not, the controller waits 418 a predetermined time for the resolution to improve, and then again checks 416 whether the resolution has reached the minimum. (It is well known that some location determining technologies, e.g., GPS, require time to achieve high resolution.)

When the resolution has reached the minimum required, or when no minimum resolution is specified in the table 328, the controller then checks 420 whether the message type indicates that the message is a reminder generated by a user of the portable subscriber unit 122 for reminding the user to perform an activity during a predetermined time frame, the activity facilitated by being within a predetermined distance of a specific location. If so, then the controller 112 has checked whether the current time is within the predetermined time frame, and has determined that it is time to activate the reminder. The controller 112 then calculates 424 the distance between the specific location specified in the reminder and the location at which the portable subscriber unit 122 is positioned. If the distance is less than the predetermined distance specified in the reminder, then the controller sends 428 the reminder message to the portable subscriber unit 122 and then checks 436 whether the process is complete. If so, the process ends. It will be appreciated that, alternatively, the reminder message feature can be performed largely in the portable subscriber unit 122 with little or no assistance from the controller 112. This would reduce over-the-air traffic at the cost of increased memory and processing usage in the subscriber unit 122.

If, on the other hand, at step 420 the message is not a reminder, then the controller checks 430 whether the message is a help! message. A help! message is defined as an urgent message intended for a specific type of user, e.g., police, firefighter, doctor, emergency rescue team, etc., and generated in response to an event that has occurred at a specific location. The help! message is preferably addressed to a group of candidate portable subscriber units 122 corresponding to the specific type of user needed to respond to the event. Different groups of candidate portable subscriber units 122 preferably are pre-programmed into a database of the controller 112 for each type of help! message. Each help! message preferably is assigned a unique PIN or telephone number. Alternatively, a common PIN or telephone number can be assigned to multiple help! messages, and the controller can poll the message originator as to the type of help needed.

If at step 430 the message is a help! message, the controller 112 begins with the first candidate portable subscriber unit 122 of the group and calculates 424 the distance between the specific location of the event and the location at which the portable subscriber unit 122 is positioned. If the distance is less than a predetermined distance specified for the event, then the controller 112 sends 428 the help! message to the candidate portable subscriber unit 122 and then checks 436 whether all candidate portable subscriber units 122 of the group have been processed. If not, the controller advances 438 to the next candidate portable subscriber unit 122 in the group, and calculates 424 the distance between the specific location of the event and the location at which the candidate portable subscriber unit 122 is positioned. The process continues in a similar fashion until all candidate portable subscriber units 122 in the group have been processed. By considering the location of the individual candidate respondents of the group, the help! message advantageously is sent to those who can respond quickly, while skipping those too far away to make a quick response. It will be appreciated that the help! message can also be sent to one or more additional candidate portable subscriber units 122 having a calculated distance greater than the predetermined distance specified for the event, when a sufficient response to the help! message transmissions has not occurred within a predetermined time, e.g., one minute.

Figure 5:
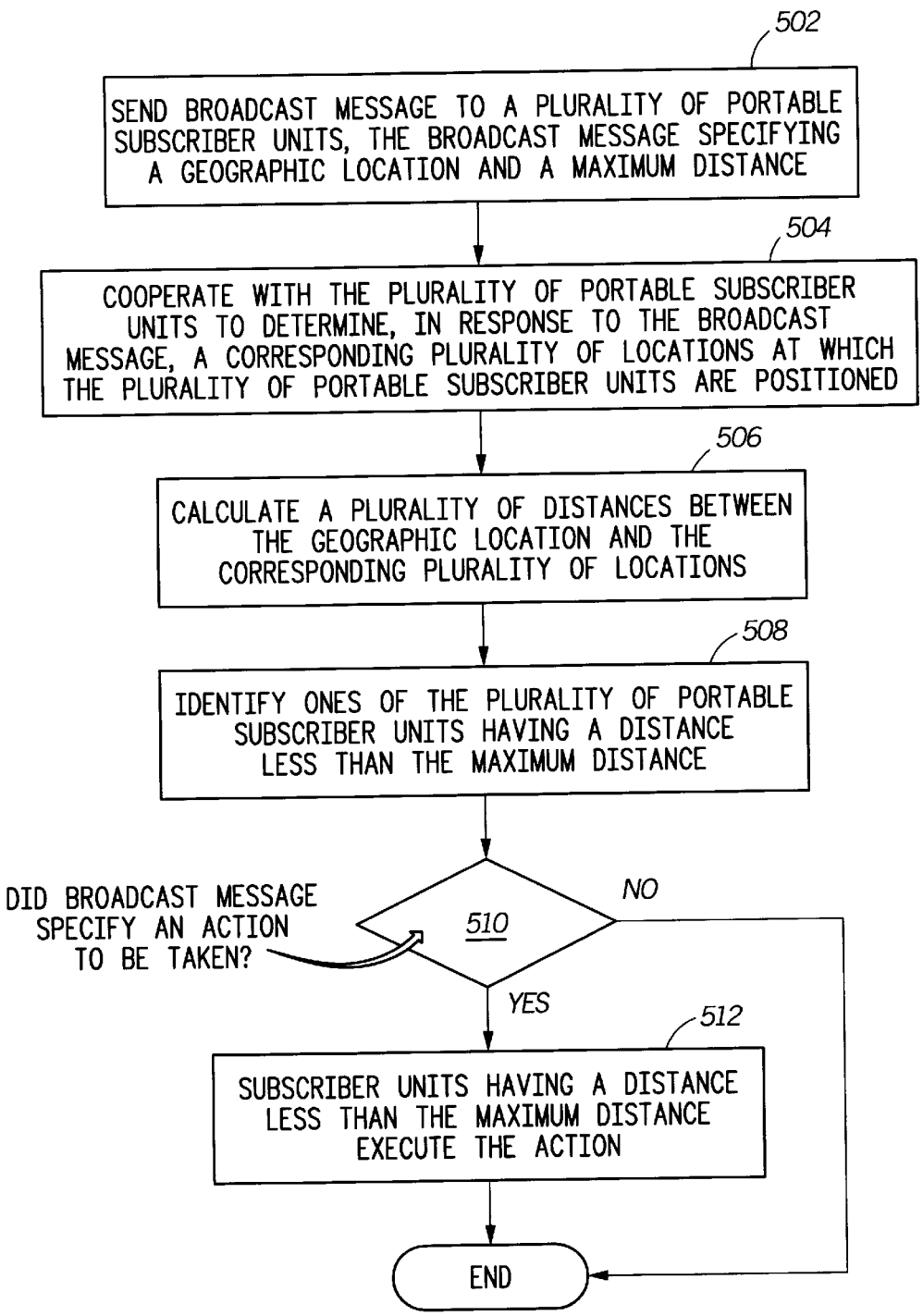
FIG. 5 is a flow diagram depicting operation of the exemplary wireless communication system in accordance with a second embodiment of the present invention.

FIG. 5 is a flow diagram depicting operation of the exemplary wireless communication system in accordance with a second embodiment of the present invention. The flow begins with the controller 112 sending 502 a broadcast message to a plurality of portable subscriber units 122, the broadcast message specifying a geographic location and a maximum distance. Optionally, the broadcast message can specify an action to be taken, as well. The plurality of portable subscriber units 122 then preferably determine 504, in response to the broadcast message, a corresponding plurality of locations at which the plurality of portable subscriber units 122 are positioned. The plurality of portable subscriber units 122 then also preferably calculate 506 a plurality of distances between the geographic location and the corresponding plurality of locations. Then ones of the plurality of portable subscriber units 122 having a distance less than the maximum distance then preferably identify 508 themselves by reporting to the fixed portion 102. It will be appreciated that, alternatively, instead of using a constant radius to define the area in which a report is required, two x, y pairs can be used to specify a rectangle, for example, or multiple x, y pairs to specify an irregular shape, for the reporting area. In addition, sub-areas can be specified to be excluded from (larger) specified areas. When at step 510 the broadcast message also specifies an action to be taken, the ones of the plurality of portable subscriber units 122 having a distance less than the maximum distance then execute 512 the action. Actions to be taken can include, for example, displaying a specific message, operating a device, and transmitting a message, to name a few.

The second embodiment in accordance with the present invention can be used, for example, by law enforcement to determine a group of people who may have witnessed a crime. Because crimes are not always discovered immediately, the plurality of portable subscriber units 122 also can be programmed to periodically determine and record a plurality of time stamped records comprising locations at which the plurality of portable subscriber units 122 are positioned. Then, after a desired reporting time frame is defined, e.g., the estimated time of the crime or a range of times, the controller 112 can send a message requesting that the ones of the plurality of portable subscriber units 122 that were located less than the maximum distance from the geographic location during the desired reporting time frame report to the fixed portion. The portable subscriber units 122 so located during the desired reporting time frame then report by sending a response to the fixed portion 102. When the broadcast message also specifies an action to be taken, the ones of the plurality of portable subscriber units 122 having a distance less than the maximum distance during the desired reporting time frame then execute the action.

An example of how the above described embodiment can be used for "lost and found" is as follows. The system broadcasts a message that is displayed only to those that were in a certain room during a certain meeting. In greater detail, a set of keys has been found in a conference room following a meeting which lasted from 9 AM to 10 AM. The system sends the following broadcast message through the building:
'Please contact security if you lost a set of keys in conference room A
in rectangle [(x1,y1), (x2,y2)]
during [5/24/99 9:00, 5/24/99 10:00].'
Only those subscriber units 122 whose time-stamped records indicate that they were in the designated conference room during the designated time frame display the message. All other subscriber units 122 advantageously do not disturb the user with what would be a non-applicable message.

Thus, it should be clear from the preceding disclosure that the present invention advantageously provides a method and apparatus that allows control of both inbound and outbound message transmissions, based upon the location of a portable subscriber unit that is receiving or sending a message, and further based upon the type of message.

Many modifications and variations of the present invention are possible in light of the above teachings. Thus, it is to be understood that, within the scope of the appended claims, the invention can be practiced other than as specifically described herein above.

What is claimed is:

1. A method in a two-way wireless communication system for location-based message transmission, comprising the steps of:
   creating a table for mapping, for ones of a plurality of portable subscriber units, a plurality of message types to a corresponding plurality of locations;
   receiving a message matching one of the plurality of message types, the message intended for a portable subscriber unit;
   determining a location at which the portable subscriber unit is positioned; and
   sending the message to the portable subscriber unit when the location matches one of the plurality of locations corresponding to the one of the plurality of message types.

2. The method of claim 1,
   wherein the message is a reminder generated by a user of the portable subscriber unit for reminding the user to perform an activity during a predetermined time frame, the activity facilitated by being within a predetermined distance of a specific location, and
   wherein the method further comprises the steps of:
      checking whether a current time is within the predetermined time frame;
      calculating a distance between the specific location and the location at which the portable subscriber unit is positioned, when the current time is within the predetermined time frame; and
      sending the message to the portable subscriber unit after performing the calculating step, when the distance is less than the predetermined distance.

3. The method of claim 1,
   wherein the message requires a minimum resolution for a determination of the location before the message is sent, and
   wherein the sending step comprises the step of ensuring that the location has been determined at a resolution of at least the minimum resolution before sending the message.

4. The method of claim 1,
   wherein the message is an urgent message intended for a specific type of user and generated in response to an event that has occurred at a specific location, and
   wherein the method further comprises the steps of:
      calculating a distance between the specific location and the location at which the portable subscriber unit is positioned, when the portable subscriber unit belongs to the specific type of user; and
      then transmitting the message to the portable subscriber unit when the distance is less than a predetermined distance.

5. The method of claim 4, further comprising, the step of sending the message to at least one additional portable subscriber unit having a calculated distance greater than the predetermined distance, when a sufficient response to the transmitting step has not occurred within a predetermined time.

6. A method in a two-way wireless communication system for location-based message transmission, comprising the steps of:
   sending a broadcast message to a plurality of portable subscriber units, the broadcast message specifying a geographic location and a maximum distance;
   determining, in response to the broadcast message, a corresponding plurality of locations at which the plurality of portable subscriber units are positioned;
   calculating a plurality of distances between the geographic location and the corresponding plurality of locations; and
   identifying ones of the plurality of portable subscriber units having a distance less than the maximum distance.

7. The method of claim 6, wherein the method further comprises the steps of:
   periodically determining and recording a plurality of time-stamped records comprising locations at which the plurality of portable subscriber units are positioned; and
   defining a desired reporting time frame, and
   wherein the determining step comprises the step of determining the corresponding plurality of locations at which the plurality of portable subscriber units were positioned during the desired reporting time frame, according to the plurality of time-stamped records.

8. The method of claim 7,
   wherein the sending step comprises the step of specifying an action to be taken, and
   wherein the method further comprises the step of executing the action by the ones of the plurality of portable subscriber units identified in the identifying step.

9. A controller in a two-way wireless communication system for location-based message transmission, comprising:
   a network interface for receiving a message;
   a processing system coupled to the network interface for processing the message; and
   a base station interface coupled to the processing system for controlling and communicating with a base station,
   wherein the processing system is programmed to:
      create a table for mapping, for ones of a plurality of portable subscriber units, a plurality of message types to a corresponding plurality of locations;
      receive the message matching one of the plurality of message types, the message intended for a portable subscriber unit;
      determine a location at which the portable subscriber unit is positioned; and
      send the message to the portable subscriber unit when the location matches one of the plurality of locations corresponding to the one of the plurality of message types.

10. The controller of claim 9,
   wherein the message is a reminder generated by a user of the portable subscriber unit for reminding the user to perform an activity during a predetermined time frame, the activity facilitated by being within a predetermined distance of a specific location, and
   wherein the processing system is further programmed to:
      check whether a current time is within the predetermined time frame;
      calculate a distance between the specific location and the location at which the portable subscriber unit is positioned, when the current time is within the predetermined time frame; and
      send the message to the portable subscriber unit after calculating the distance, when the distance is less than the predetermined distance.

11. The controller of claim 9, wherein the message requires a minimum resolution for a determination of the location before the message is sent, and wherein the processing system is further programmed to ensure that the location has been determined at a resolution of at least the minimum resolution before sending the message.

12. The controller of claim 9, wherein the message is an urgent message intended for a specific type of user and generated in response to an event that has occurred at a specific location, and wherein the processing system is further programmed to:

calculate a distance between the specific location and the location at which the portable subscriber unit is positioned, when the portable subscriber unit belongs to the specific type of user; and transmit the message to the portable subscriber unit when the distance is less than a predetermined distance.

13. The controller of claim 12, wherein the processing system is further programmed to send the message to at least one additional portable subscriber unit having a calculated distance greater than the predetermined distance, when a sufficient response has not occurred within a predetermined time after transmitting the message.

14. A controller in a two-way wireless communication system for location-based message transmission, comprising:

a network interface for receiving a message;

a processing system coupled to the network interface for processing the message; and a base station interface coupled to the processing system for controlling and communicating with a base station, wherein the processing system is programmed to:

send a broadcast message to a plurality of portable subscriber units, the broadcast message specifying a geographic location and a maximum distance; and receive a response from ones of the plurality of portable subscriber units identifying the ones of the plurality of portable subscriber units having a distance from the geographic location of less than the maximum distance.

15. The controller of claim 14, wherein the processing system is further programmed to:

define a desired reporting time frame;

send a history request message comprising the desired reporting time to the plurality of portable subscriber units; and receive an answer from the plurality of portable subscriber units having a separation from the geographic location of less than the maximum distance at the desired reporting time frame.

16. The controller of claim 15, wherein the processing system is further programmed to specify in the broadcast message an action to be taken.

17. A portable subscriber unit in a two-way wireless communication system for location-based message transmission, comprising:

a receiver for receiving an outbound message;

a processing system coupled to the receiver for processing the outbound message; and a transmitter coupled to the processing system for transmitting an inbound message, wherein the processing system is programmed to:

cooperate with the receiver to receive a broadcast message specifying a geographic location and a maximum distance;

determine, in response to the broadcast message, a location at which the portable subscriber unit is positioned;

calculate a distance between the geographic location and the location at which the portable subscriber unit is positioned; and cooperate with the transmitter to transmit information identifying the portable subscriber unit to a fixed portion of the two-way wireless communication system when the distance is less than the maximum distance.

18. The portable subscriber unit of claim 17, wherein the processing system is further programmed to:

periodically determine and record a plurality of time-stamped records comprising locations at which the portable subscriber unit is positioned;

cooperate further with the receiver to receive a message defining a desired reporting time frame;

determine the location at which the portable subscriber unit was positioned at the desired reporting time frame, according to the plurality of time-stamped records; and use the location at which the portable subscriber unit was positioned at the desired reporting time to calculate the distance.

19. The portable subscriber unit of claim 18, wherein the broadcast message specifies an action to be taken, and wherein the processing system is further programmed to execute the action when the distance is less than the maximum distance.

* * * * *